Figure 3:
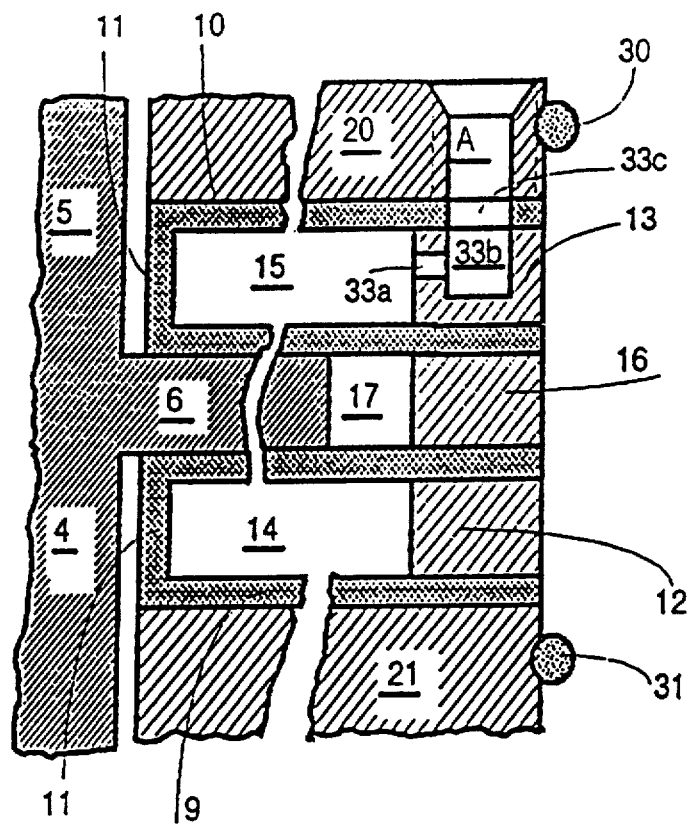

United States Patent [19]

Bertsch

[11] Patent Number: 5,074,568
[45] Date of Patent: Dec. 24, 1991

[54] SHAFT SEAL

[76] Inventor: Erich Bertsch, Lindbuckweg 26, Lörrach 7850, Fed. Rep. of Germany

[21] Appl. No.: 510,851

[22] Filed: Apr. 18, 1990

[30] Foreign Application Priority Data

Apr. 25, 1989 [CH] Switzerland .................. 573/89

[51] Int. Cl.$^5$ .............................................. F16J 9/20
[52] U.S. Cl. ......................................... 277/44; 277/3;
277/17; 277/27; 277/178; 277/205
[58] Field of Search ................ 277/2, 3, 17-22,
277/27, 70-72 R, 70-72 FM, 178, 205, 206 R,
101, 102, 105, 37, 123-125, 15, 16, 76, 183, 200

[56] References Cited

U.S. PATENT DOCUMENTS

| | | | |
|---|---|---|---|
| 2,547,185 | 4/1951 | Van Bolhar | 277/206 R |
| 3,169,024 | 2/1965 | Johnson et al. | 277/3 |
| 3,455,567 | 7/1969 | Burtis | 277/178 |
| 3,514,114 | 5/1970 | Monahan | 277/3 |
| 3,860,270 | 1/1975 | Arnold | 277/206 R |
| 4,067,585 | 1/1978 | Rode | 277/206 R |
| 4,358,119 | 11/1982 | Kryczun | 277/3 |
| 4,706,970 | 11/1987 | Ramirez | 277/124 |
| 4,718,820 | 1/1988 | Jaques | 277/27 |
| 4,817,966 | 4/1989 | Borowski | 277/3 |

FOREIGN PATENT DOCUMENTS 0572587 2/1976 Switzerland .

Primary Examiner—William A. Cuchlinski, Jr.
Assistant Examiner—D. DePumpo
Attorney, Agent, or Firm—Brady, O'Boyle & Gates

[57] ABSTRACT

The shaft seal between a fixed housing wall (2) and a revolving shaft (1) consists of a collar (6) fixedly connected to the shaft (1), respectively one leg of the U-shaped sealing rings (69, 71) pressing against this collar. The cavities (14, 15) of the sealing rings (69, 71) can be acted upon, via connections, by a pressure medium, wherein respectively one of the legs of the sealing rings (69, 71) is pressed sealingly against the collar (6). The annular chamber (17) coaxial to the end face of the collar (6) can be filled with a lubricant and/or a coolant by way of an inlet and outlet. This structurally simple shaft seal is arranged in compact fashion. This seal operates in a safe and reliable manner. For the prevention of chemical accidents, a circulating pressure medium can be provided to act only on the sealing ring (69) located closest to the reaction chamber (3), and this pressure medium can be continuously monitored for traces from the reaction chamber (3) by way of an indicator. Upon the occurrence of a leak, the cavity (15) of the second sealing ring (71) is automatically pressurized, which then provides the further sealing action. Thereafter, an exchange or repair of the sealing unit (57) can be prepared at leisure.

20 Claims, 4 Drawing Sheets

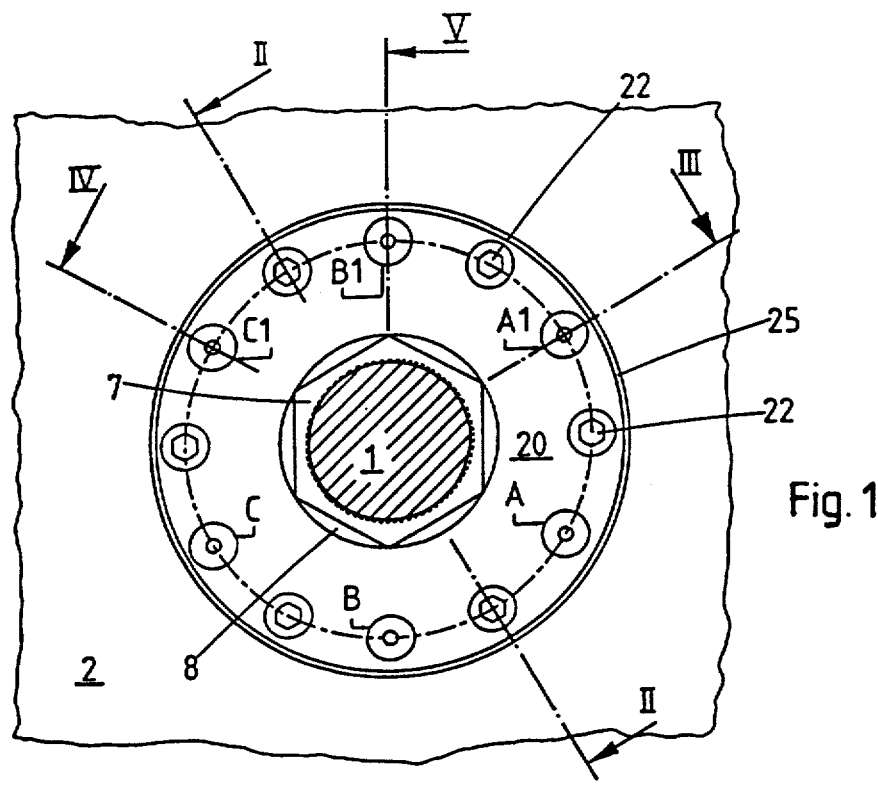
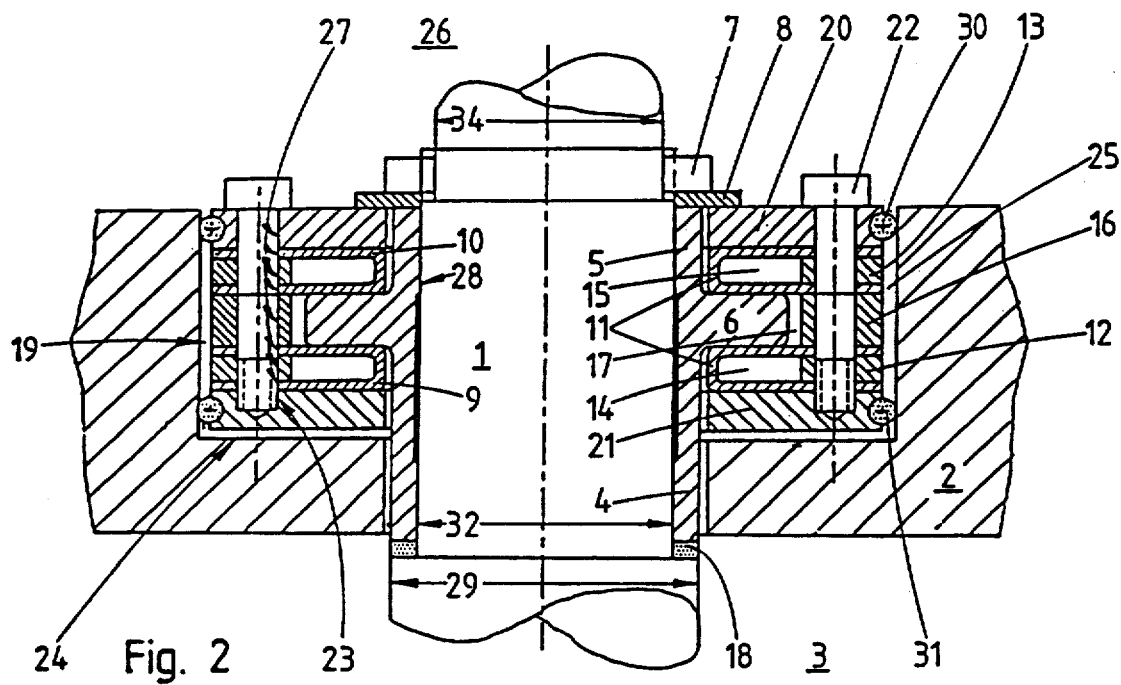

SHAFT SEAL

The invention relates to a shaft seal, or a shaft sealing device for a shaft extended through a housing wall, and rotating relative to the housing wall, and to the combination of a shaft extending through a housing wall and a shaft sealing device.

A shaft seal of this type has been known from Swiss A 572,587. The annular seal of this conventional shaft seal consists of a single sealing ring having a U-shaped cross-sectional profile, the profile member joining the U-legs being urged against the shaft, both U-legs being respectively urged against a fixed supporting surface.

The above-described shaft seal has the disadvantages, due to its structure, of incurring a relatively extensive wear of the axial sealing surface and of allowing escape of the medium to be sealed off in case of a leak.

The invention solves the problem of providing a shaft seal or a shaft sealing device which is constructed in a structurally simple way and in compact fashion and results in a sealing action which is safe in operation and which is reliable.

The advantages attained by the invention are to be seen essentially in that at least one radial surface provides a sealing effect, in place of an axial sealing surface, and, with only one rotating collar, a double seal can be achieved. These sealing surfaces can be arranged to be of a meander shape—as seen in cross section—whereby the sealing effects of several series-disposed sealing surfaces are added up. Based on the structure, the shortest connecting line between the space under environmental conditions and the space to be sealed off can be designed to be significantly longer in case of a radial sealing surface. The longer connecting line results, with equal pressure being applied to the sealing ring or rings, in a markedly better sealing action, i.e. with a given sealing effect, the necessary contact pressure can be reduced in case of a radial sealing surface. A lower contact pressure results in less wear on the material. Based on the lower wear on the material, with the same required tool life of the gasket, the wall thickness of the sealing rings can be reduced. A reduction in wall thickness increases the flexibility, and thus, in turn, the sealing effect, and furthermore enhances the heat conduction to the pressure medium.

In a structurally particularly advantageous embodiment, the sealing rings, just as the sealing ring in the known shaft seal (Swiss A 572,587), are designed with a U-shaped cross-sectional profile and are arranged to face the shaft with the profile member joining the U-legs; this profile member, differently from the conventional arrangement, has a spacing from the shaft but could also be in contact with the latter. In another improvement, the profile section joining the U-legs is designed to have the form of a W instead of having an approximately linear bottom; this provides a reservoir of material when the sealing rings are placed under pressure whereby improved contacting of the sealing rings is ensured.

In a further development of this embodiment, an annular chamber, for example for a lubricant and/or coolant, is formed between the sealing rings, this chamber being defined along the inner chamber periphery by the peripheral surface of the collar and along the outer chamber periphery by the inner peripheral surface of the second spacer ring. In this arrangement, the cavity of the sealing rings can be located in a pressure medium circuit with cooler in order to reduce wear on the sealing rings, this wear being aggravated with rising temperature.

In a further development, significant for environmental protection and the prevention of chemical accidents, the annular chamber is disposed in a circuit for a fluid containing an indicator destined to respond to a substance entering the annular chamber in case of inadequate tightness of the shaft seal, and to transmit a signal triggering an alarm and/or protective measures. In this system, during normal operation, only the sealing ring can be active which is on the side of the shaft seal where a pressure is ambient that is higher than on the other side, or where the substance to be sealed off is located, and the signal can trigger activation of the other sealing ring.

Figure 4:
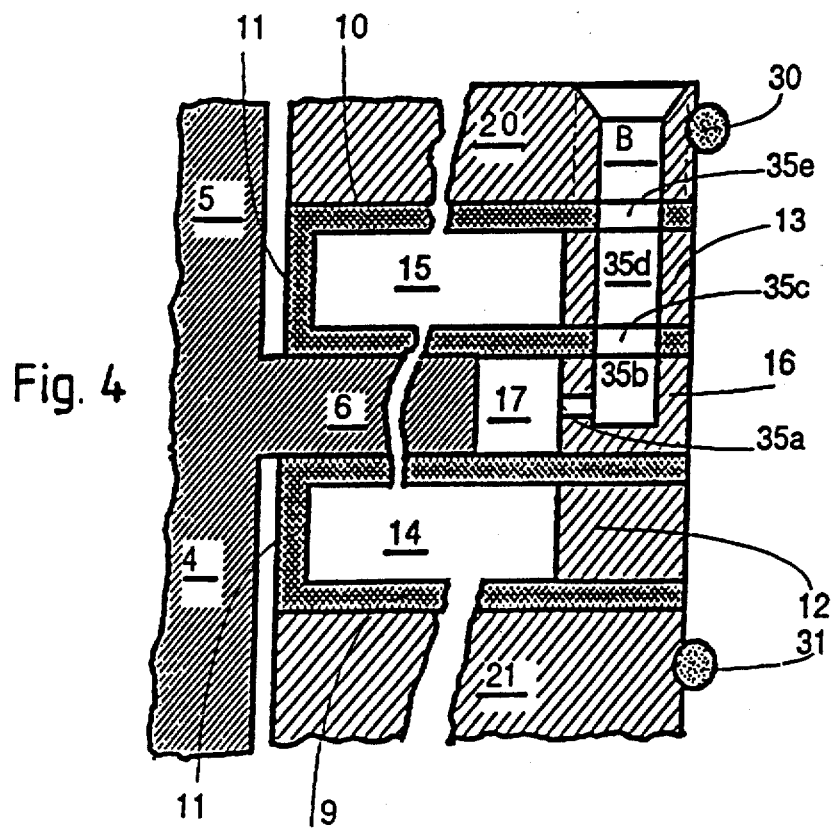
Figure 5:
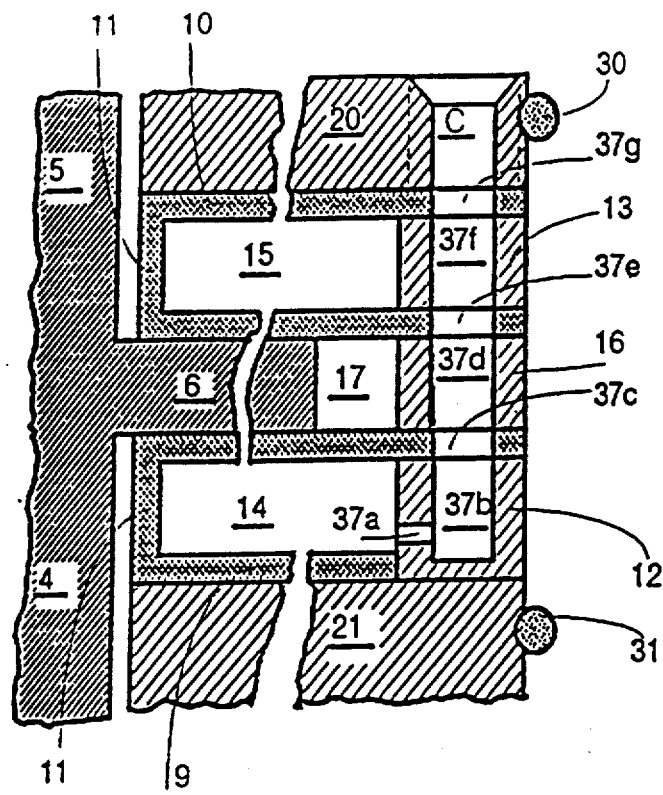
Figure 6:
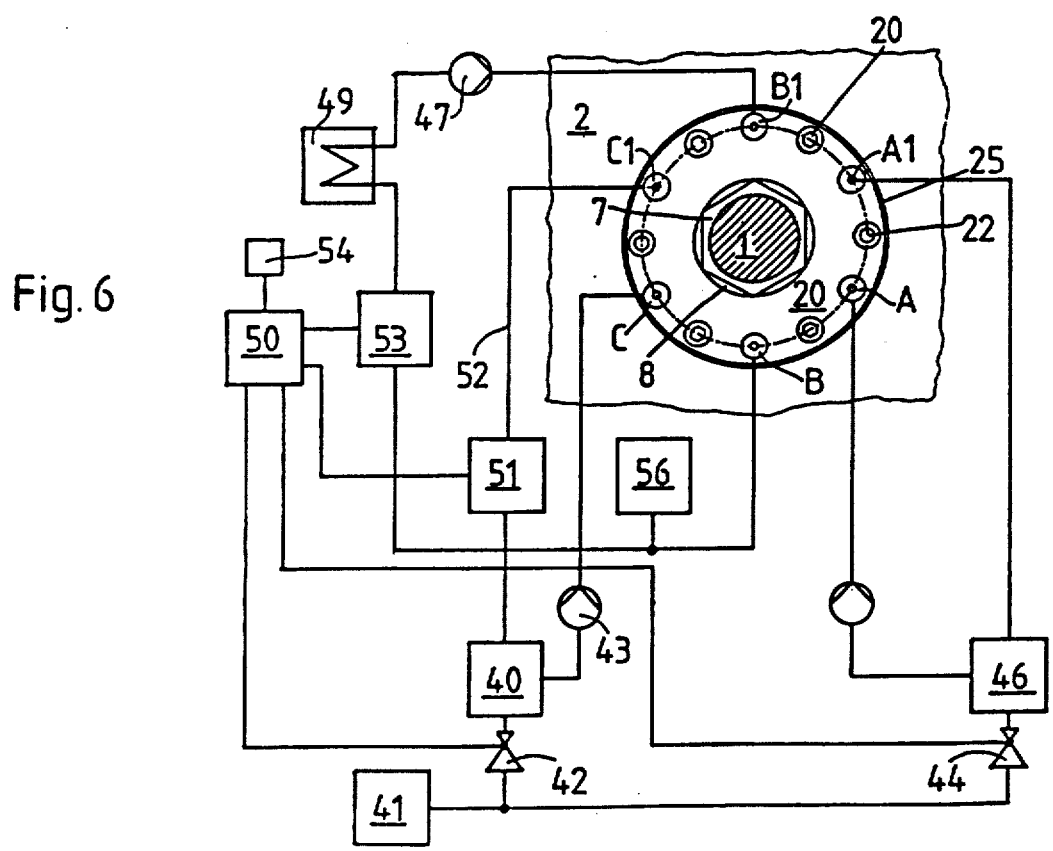
Figure 7:
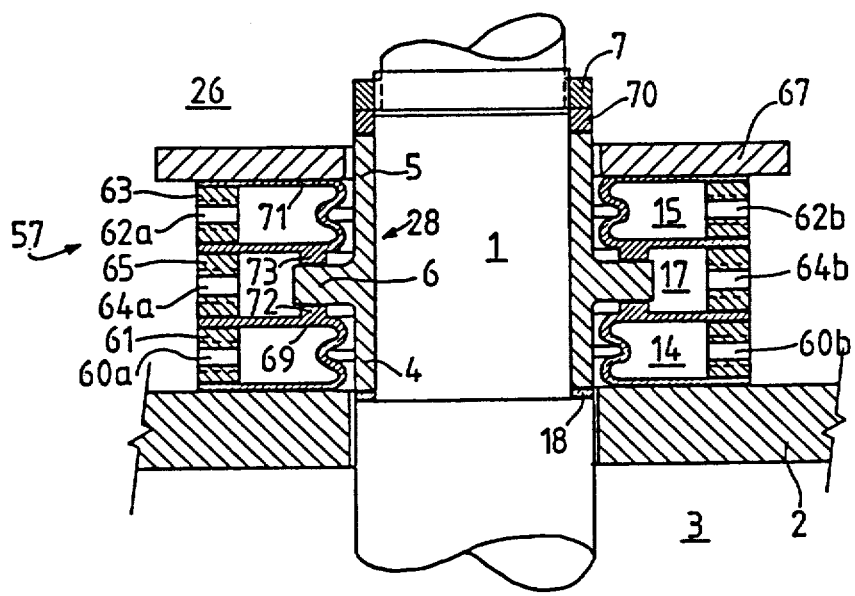
Figure 8:
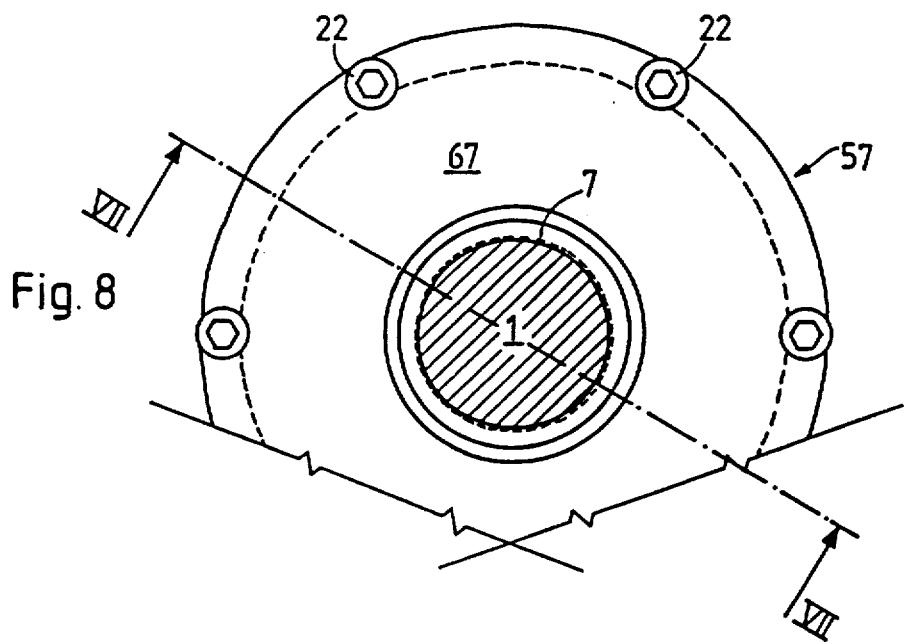

Additional embodiments and advantages of the invention achieved thereby can be seen from the description set forth below wherein the invention will be explained in greater detail with reference to the drawings wherein:

FIG. 1 is a top view of the shaft seal,

FIG. 2 is a longitudinal section along line II—II in FIG. 1 through the arrangement, FIG. 3 is a partial sectional view along line III in FIG. 1, FIG. 4 is a partial sectional view along line IV in FIG. 1, FIG. 5 is a partial sectional view along line V in FIG. 1, FIG. 6 is a schematic representation of the fluid circuits pertaining to the annular chamber and cavities formed by the sealing rings of the shaft seal illustrated in FIGS. 3–5, FIG. 7 is a longitudinal section through a modification of the shaft seal along line VII—VII in FIG. 8, and FIG. 8 is a top view of the version in FIG. 7.

A working or reaction chamber 3, to be sealed off from the surroundings 26 and surrounded by a housing wall 2, can contain an agitator, a pump, or another revolving mechanism, not illustrated, driven by an external drive mechanism, not shown, by way of a shaft 1. In order to provide a complete seal of the reaction chamber 3 with respect to the environment 26, the shaft 1 extends through a sealing unit 19 connected with the housing wall 2, this unit being fixed and not partaking in the rotation. The sealing unit 19 does not have a bearing function.

As shown in FIG. 2, a swivel member 28 with a circular ring-shaped collar 6 is seated in a gas- and liquid-tight fashion on the shaft 1 between two cylindrical parts 4 and 5 wherein the longer cylindrical part 4 points toward the reaction chamber 3, the cylindrical part 5, being approximately half as long, extending away from the reaction chamber 3 in the direction of the surroundings 26. The outer diameter of the two cylindrical parts 4 and 5 is of identical size, and the length of the swivel member 28 corresponds approximately to the thickness of the housing wall 2.

A sealing ring 9 having a U-shaped cross section is disposed coaxially to the cylindrical part 4, one of its legs being in contact with the radial surface of the collar 6 facing the reaction chamber 3, and the profile member 11 connecting the two legs of the sealing ring 9 facing the cylindrical part 4. Analogously, one leg of a second sealing ring 10, corresponding to sealing ring 9, is in contact, coaxially to part 5, with the radial surface of the collar 6 facing the surroundings 26. The other leg of the sealing ring 10 is in contact with the inner surface of an end ring 20 closing off the sealing element 19 toward the outside, and the other leg of the sealing ring 9 is analogously in contact with an inner surface of an end ring 21 closing off the sealing element 19 with respect to the reaction chamber 3.

In order to obtain satisfactory sliding properties of the legs of the sealing rings 9 and 10 on the collar 6, they consist of a synthetic resin of the chemical group of tetrafluorolefin in which graphite is embedded as a lubricant out of the chemical group of tetrafluorolefin, tetrafluorethylene is preferably used.

The cavity 14 and, respectively, 15 in the U-shaped sealing ring 9 and, respectively, 10 is sealed off coaxially with respect to the shaft 1 by respectively one spacer ring 12 and 13. An annular chamber 17 sealed off coaxially with respect to the shaft 1 by a spacer ring 16 is arranged coaxially to the peripheral surface of the collar 6. The thickness of the spacer rings 12 and 13 is identical to the leg spacing of the sealing rings 9 and 10, and the thickness of spacer ring 16 is equal to the width of the collar 6.

The two end rings 20 and 21 and the three spacer rings 12, 13 and 16 have the same outer diameter as the two sealing rings 9 and 10. The inner diameter of the end rings 20 and 21 is the same and is larger by one clearance tolerance than the outer diameter of the cylindrical parts 4 and 5, respectively, of the swivel member 28. The inner diameter of the three spacer rings 12, 13 and 16 is chosen so that there is adequate space for the bores described below (A, A1, 33b/c; B, B1, 35b-e; C, C1, 37b-g).

The end ring 20 carries six clamping screws 22 at equal angular spacings of 60° in the proximity of its outer rim, as can be seen in FIG. 1. Each of these clamping screws 22 extends through superimposed bores 27 in the end ring 20, the two legs of the sealing ring 10, the three spacer rings 13, 16 and 12, the two legs of the sealing ring 9, into respectively one threaded blind hole 23 of the end ring 21, and holds the sealing unit 19 together which has been formed from the above-recited components. The sealing unit 19 is located in a cylindrical depression 24 of the housing wall 2. An annular gap 25 between the housing wall 2 and the sealing unit 19, coaxial to the shaft 1, as is required for assembly, is sealed off by two coaxial O rings 30 and 31. The O ring 30 lies in a peripheral groove of the end ring 20, and the O ring 31 is disposed in a peripheral groove of the end ring 21.

The connections A, C, B and A1, C1, B1 for influx and efflux into and from the cavities 15 and 14 and, respectively, the annular chamber 17 are in each case staggered with respect to the clamping screws 22 on the circle thereof which is coaxial to the shaft 1. The connections B and B1 of the lubricant or coolant feed and discharge to and from the annular chamber 17 are in mutually diametrical opposition while the inlet and outlet means A and A1 and, respectively, C and C1 of the pressure medium for the cavities 15 and 14, respectively, lie in each case to the left and to the right of one of the clamping screws 22.

The cavity 15, as shown in FIG. 3, is in communication with the inlet connection A in the end ring 20 by way of a radial bore 33a as well as adjoining bores 33b, axially in parallel to the shaft 1, in the spacer ring 13, and 33c in the leg of the spacer ring 10 facing the end ring 20. The axially parallel bores (not shown) pertaining to the outlet connection A1 are arranged analogously.

The annular chamber 17, as shown in FIG. 4, is in communication with the feed connection B in the end ring 20 by way of a radial bore 35a, as well as adjoining bores 35b, axially in parallel to the shaft 1, in the spacer ring 16; 35c in the leg of the sealing ring 10 facing the collar 6; 35d in the spacer ring 13; and 35e in the leg of the sealing ring 10 facing the end ring 20. The axially parallel bores (not shown) pertaining to the discharge connection B1 are arranged in analogous fashion.

The cavity 14, as shown in FIG. 5, is in communication with the feed connection C in the end ring 20 via a radial bore 37a, as well as adjoining bores 37b, axially in parallel to the shaft 1, in the spacer ring 12; 37c in the leg of the sealing ring 9 facing the collar 6; 37d in the spacer ring 16; 37e in the leg of the sealing ring 10 facing the collar 6; 37f in the spacer ring 13; and 37g in the leg of the sealing ring 10 facing the end ring 20. The bores (not shown) pertaining to the discharge connection C1 are analogously arranged.

The diameter of the shaft 1 is reduced stepwise from the diameter 29 in the reaction chamber 3 by way of the diameter 32 in the region of the sealing unit 19 with the attached swivel member 28, to the diameter 34 in the space 26 with the surrounding atmosphere. The portion of shaft 1 having the diameter 32 is approximately as long as the swivel member 28 plus the thickness of an intermediate ring 18, a disk 8, and plus the thickness of a clamping nut 7. A thread for the clamping nut 7 is located on the end of the shaft portion having the diameter 32 and facing away from the reaction chamber 3. Based on these three stages, the swivel member 28 with the sealing unit 19 can be pushed without problems over the shaft 1 until the cylindrical part 4 abuts with its end face against the intermediate ring 18 made of a deformable sealing material in front of the step to the shaft diameter 29. With the aid of the clamping nut 7, the collar 6 is urged by way of the disk 8 against the intermediate ring 18 until the swivel member 28 is in sealing relationship with the shaft 1. Sealing thus is effected via the intermediate ring 18, the two sealing rings 9 and 10, and via the two O rings 30 and 31. During operation, the disk 8 furthermore prevents migration of the sealing unit 19 from its seat.

The spacer rings 12, 13 and 16 each have two radial bores 33a, 35a and 37a, respectively, connecting the respective cavity 14 or 15 as well as the chamber 17 with the axially parallel bore 33b, 35b and 37b, respectively. In place of these radial bores 33a, 35a and 37a, respectively, radial slots can be provided on respectively one or both lateral surfaces of the respective spacer rings 13, 16 and 12.

In place of the two axially parallel bores 33, 35 and 37, it is possible also to arrange only a single bore, if throughflow of pressure medium, coolant and/or lubricant is omitted.

The cylindrical depression 24 can be utilized, without restriction of function, for a horizontally driving shaft 1, such as, for example, in agitator systems, or for a vertically driving shaft 1, such as, for example, in pumps and compressors. The bearings in the agitator system, in the pump, etc., take over the mounting of the shaft 1 with respect to the housing wall 2.

The peripheral grooves in the end rings 20 and 21 for the two O rings 30 and 31 can be omitted. As described above, during assembly the sealing unit 19 is pressed against the sealing intermediate ring 18 until the swivel member 28 is sealed on the shaft. The O rings 30 and 31 then are located somewhere in the annular gap 25.

In the operating condition, only the cavity 14 is fully pressurized by means of a gas or a liquid from a reservoir 40, as shown in FIG. 6, by way of its connections C and C1 with a pressure-reducing valve 42 in communication with a central pressure unit 41. The gas or the liquid are circulated by means of a circulating pump 43. The annular chamber 17 serves as a cooling and lubricating chamber. The sealing ring 10 serves as a backup seal, and the cavity 15 encompassed thereby is pressurized by means of gas or liquid from a reservoir 46 with a pressure reducing valve 44, likewise connected to the central pressure unit 41, only to such an extent that the coolant and lubricant in the annular chamber 17 does not leak out. The illustration of the circulation routes in FIG. 6 does not include self-evident details, such as, for example, venting valves, etc.

By the pressure in the cavity 14, the legs of the sealing ring 9 are urged, on the one hand, against one lateral surface of the revolving collar 6 and, on the other hand, against the end ring 21. The pressure is set by means of the pressure reducing valves 42 in an infinitely variable fashion so that a sealing effect is obtained due to the elastic legs of the sealing ring 9. Imbalance or bending of the shaft 1 is thereby compensated.

The annular chamber 17 is located with its connections B and B1 in a liquid circuit, schematically illustrated in FIG. 6, wherein water or another suitable fluid as the coolant and lubricant is maintained in circulation by means of a pump 47. Heat, generated by sliding friction between the collar 6 and respectively one of the legs of the sealing rings 9 and 10, is removed from the coolant and lubricant by means of a heat exchanger 49. The pressure medium for cavities 14 and 15 normally is not cooled, but it can be cooled in special cases.

If a leak occurs in the cavity 14, the leakage fluid is detected by conventional technique with a leakage detector 51 in an outlet conduit 52, leading away from the connection C1, in the recirculated pressure medium of the cavity 14, and a signal is transmitted to an evaluating device 50 connected to the leakage detector 51 whereupon an alarm is triggered in an alarm unit 54 connected to the evaluating device. Full pressure is applied to the cavity 15 by the evaluating device 50 via the pressure reducing valve 44. The sealing ring 10 in this case takes over the sealing function against the surroundings 26, in most cases the side of the atmosphere. Subsequently, a gas or fluid which, for example, endangers the environment, present in the reaction chamber 3, can be removed, or the reaction can be interrupted in proper fashion whereafter the cause of the leak, e.g. the sealing ring 9, can then be searched for and eliminated. Since the sealing ring 9 is under increased pressure with respect to the sealing ring 10, it can be assumed that in all cases the sealing ring 9 will be the first to become defective.

For safety reasons, a leakage detector 53 is likewise provided in the coolant circuit; this detector acts analogously to the leakage detector 51.

It can be practical in chemical industry to process especially sensitive or poisonous liquids with a definite leakage rate. For this purpose, a pressure evoking a specific leakage rate is set in the cavity 14. The leakage rate is then continuously measured and the leakage fluid is withdrawn from the annular chamber 17 by means of a suction removal device 56.

The liquid taking up the leakage fluid or gas is preferably introduced into the intake side of the machine. If a vacuum prevails on the intake side, then, depending on the pressure in cavity 15, a leakage rate can be set from the atmosphere or from a blanketing inert gas. A tightness rate with respect to the surroundings 26 can likewise be set by means of pressure in the cavity 15.

In a modification of the shaft seal illustrated in FIG. 7, a sealing unit 57 analogous to sealing unit 19 is directly attached to the housing wall 2. The end ring 21, as utilized in the sealing unit 19, is thus eliminated. The blind threaded holes for the clamping screws 22 are in this case arranged directly in the housing wall 2. A sealing ring 69 analogous to sealing ring 9 then presses with one of its legs against the housing wall 2 and with the other leg furthermore against one of the lateral faces of collar 6. The two O rings 30 and 31, as well as the cylindrical indentation 24, are eliminated.

In the version of the shaft seal shown in FIG. 7, respectively two bores 60a/60b, 62a/62b and 64a/64b which are approximately in diametrical opposition extend through the spacer rings 61, 63 and 65 which latter are analogous to spacer rings 12, 13 and 16. The spacer rings 61 and 63 are of identical thickness. The thickness of spacer ring 65 is equal to the sum total of the width of collar 6 plus the height of the two lobes of material 72 and 73 on the sealing rings 69 and 71 described below. An end ring 67 of analogous structure with respect to the end ring 20 has an outer diameter that is enlarged as compared with the spacer rings 61, 63 and 65. As can be seen in top view in FIG. 8 of the modification of the shaft seal, six clamping screws 22 are likewise inserted along the outer rim of the end ring 67. The spacing of the screw holes from the axle 1 is selected so that the shank jacket of the clamping screws 22 contacts the outer edge of the spacer rings 61, 63 and 65. The clamping screws 22 thus secure the spacer rings 61, 63 and 65, as well as also the sealing rings, here denoted by 69 and 71, against lateral slippage.

Since, in the version illustrated in FIG. 7, the sealing unit 57 is attached to the housing wall 2 by means of the clamping screws 22, it need no longer be sealed, either, against migrating by means of the disk 8 sliding on the end ring 20. A disk 70 analogous to the disk 8 has an outer diameter corresponding approximately to the outer diameter of the cylindrical part 5 and serves together with the intermediate ring 18 for retaining the swivel member 28, as described above.

The bottom of the U-shaped profile of the sealing rings 69 and 71 has a W-shaped curvature, in contrast to the planar profile portion of the sealing rings 9 and 10. This curvature forms a material reservoir and thereby permits improved pressure contact of the legs of the sealing rings 69 and 71 against the collar 6 as well as against the housing wall 2 and, respectively, the end ring 67.

On their legs facing the collar surfaces, the sealing rings 69 and 71 are provided with a lobe of material 72 and 73. Since the legs facing the collar surfaces are prone to wear by abrasion due to friction against the collar surfaces, the service life of the sealing rings 69 and 71 is significantly increased by the thickened portions of material 72 and 73.

Leakage sites become immediately apparent in case of the sealing unit 57 since it is seated on the housing wall 2. No cross flow can occur between the chambers 14, 17 and 15.

Owing to its "floating" bearing without direct attachment to the housing wall 2, the sealing unit 19 can readily absorb impacts exerted on the axle 1.

I claim:

1. A shaft-sealing device for a shaft (1) entering a chamber (3) inside a housing (2), said shaft (1) extending through the housing (2), said shaft (1) connected to rotate relative to said housing (2), comprising said shaft-sealing device a circular ring-shaped collar (6) situated surrounding said shaft (1), said collar (6) fixedly and leak-proof connected to said shaft (1), a supporting surface (21; 2) oppositely located to said collar (6) and surrounding said shaft (1), annular sealing means (9, 10; 69, 71) coaxially situated around said shaft (1) between said collar (6) and said supporting surface (21; 2), said sealing means (9, 10; 69, 71) having a hollow interior (14, 15) surrounding said shaft (1), said sealing means (9, 10; 69, 71) having at least a first and a second annular wall part and an annular opening coaxially situated with respect to said shaft (1), the first wall part being forcible against said supporting surface (21; 2), the second wall part being forcible against said collar (6), a locking element (12, 13; 61, 63) surrounding said shaft (1), said locking element sealing said annular opening and locking the sealing means (9, 10; 69, 71) against rotation, a pumping unit (43) for pumping a fluid, circuit means connected with said pumping unit, said locking element (12, 13; 61, 63) having connecting means (60b, 62b) for connecting said circuit means for conducting a fluid from said pumping unit (43) into said hollow interior for forcing said first and second wall parts against said supporting surface (21; 2) and said collar (6), and fixing means (22, 30, 31; 22) for fixing said locking element (12, 13; 61, 63) against rotation relative to the housing (2).

2. A shaft-sealing device according to claim 1, including a supporting element having said supporting surface and surrounding said shaft, said supporting element fixedly and leak-proof connected to said housing (2).

3. A shaft-sealing device according to claim 1, in which said shaft extends through said supporting surface and part of the wall of the housing extends past said supporting surface.

4. A shaft-sealing device according to claim 1, including a flange (20; 67) surrounding said shaft (1), second annular sealing means (10; 71) coaxially situated to said shaft (1) between said collar (6) and said flange (20; 67), said second sealing means (10; 71) having a second hollow interior (14) surrounding said shaft (1), said second sealing means (10; 71) having at least a first and a second annular wall part and an annular opening coaxially situated in respect to said shaft (1), the first wall part of said second sealing means being forcible against said flange (20; 67), the second wall part of said second sealing means being forcible against said collar (6), a second locking element (13; 63) surrounding said shaft (1), said second locking element sealing said opening and locking the second sealing means (10; 71) against rotation, second circuit means, said second locking element (13; 63) having connecting means (A, A1, 33b, 33a; 62a, 62b) for connecting said second circuit means for conducting a fluid from said pumping unit into said second hollow interior for forcing said first and second wall parts of said second sealing means against said flange (20; 67) and said collar (6), and second fixing means (22, 30, 31; 22) for fixing said second locking element (13; 63) against rotation relative to said housing.

5. A shaft-sealing device according to claim 1, in which said connecting means comprises at least one connecting element, said locking element (12, 13; 61, 63) is built as a hollow cylinder having said at least one connecting element for said circuit means passing through the cylinder wall.

6. A shaft-sealing device according to claim 1, in which said sealing means (9, 10; 69, 71) has a U-shaped cross-section, where said opening is situated at the outer periphery opposite to the shaft (1), and the base of the U-shaped cross-section is adjacent to said shaft (1).

7. A shaft-sealing device according to claim 6, in which said locking element (12, 13; 61, 63) is situated at least partly between the legs of the U-shaped cross-section of the sealing means (9, 10; 69, 71) forming said hollow interior (15).

8. A shaft-sealing device according to claim 6, in which said base of the sealing means (9, 10; 69, 71) is curved, preferably in a W-shape, in order to constitute a material reservoir when the said wall parts are forced.

9. A shaft-sealing device according to claim 1, including a spacer element (16, 65) surrounding said collar (6), having a thickness approximately equal to the thickness of said collar (6), situated adjacent to said second wall part of said sealing means between the collar (6) and said supporting surface (21; 2) and forming a hollow space (17) surrounding said collar (6).

10. A shaft-sealing device according to claim 9, including another circuit means, and said spacer element (16, 65) having at least one connecting element (B, 35b, 35d; 64b) for connecting said another circuit means to said spacer element.

11. A shaft-sealing device according to claim 1, comprising a thickened portion (72, 73) of material on the wall part of said sealing means (9, 10; 69, 71) being forcible against said collar (6), in order to increase its service life.

12. A shaft-sealing device according to claim 1, and said collar (6) having a foot portion (5), collar sealing means (18) leak-proof attaching said foot portion (5) to said shaft (1), collar fixing means removably secured to said shaft (1) and fixedly securing the foot portion (5) to the shaft (1) so that the collar portion rotates with the shaft (1) and the collar (6) can be slipped on and off the shaft (1) for maintenance work.

13. A shaft-sealing device according to claim 6, in which said fixing means (22) leak-proof fix against rotation the legs of the U-shaped cross-section of the sealing means (9, 10; 69, 71) against the locking element (12, 13; 61, 63) and against the supporting surface (21, 2; 2).

14. A shaft-sealing device according to claim 4, said fixing means (22) leak-proof connecting the first and second wall part of the first and second sealing means (9, 10; 69, 71) against the first and second locking element (12, 13; 61, 63), against the flange (20; 67) and against the supporting surface (21, 2; 2).

15. A shaft-sealing device according to claim 4, including a spacer element (16; 65) surrounding said collar (6) between said first and second sealing means, said fixing means (22) leak-proof connecting and fixing against rotation the first and second wall parts of the first and second sealing means (9, 10; 69, 71) against the first and second locking element (12, 13; 61, 63) against the supporting surface (21, 2; 2), against the flange (20; 67), and against the spacer element (16, 65).

16. A shaft-sealing device according to claim 15, including through-bores through the locking elements (12, 13; 61, 63), the flange (20), and the spacer element (16, 65); tap holes through the supporting surface; and said through-bores aligned with said tap holes for connecting retainers therethrough and into said tap holes.

17. A shaft-sealing device according to claim 10, in which said another circuit means comprises a lubricant circuit.

18. A shaft-sealing device according to claim 17, including a cooling unit (49) and a pumping unit (47) connected to said lubricant circuit for pumping a lubricant through said hollow space (17) surrounding said collar (6) and cooling the lubricant.

19. A shaft-sealing device according to claim 10, in which said another circuit means comprises a suction pipe connected to the connecting element (B, B1; 64a, 64b) of the spacer element (16, 65), a suction removal device (56) connected to the suction pipe, a leakage detector (53) connected to the suction pipe, a pressure circuit connected to the connecting means (C, C1; 60a, 60b) of the first locking element (12, 61), a pumping unit (43) and a pressure adjusting unit (42) connected to the pressure circuit, the pressure adjusting unit (42) adjusting the pressure of the fluid inside the pressure circuit, the suction removal device (56) removing a leakage entering into the hollow space (17) from the chamber (3), said leakage determined by the pressure difference between the pressure inside the pressure circuit and inside the suction pipe.

20. A shaft-sealing device according to claim 17, including an indicator unit (53) connected to the lubricant circuit for indicating materials entering into the lubricant by leaky first sealing means (9; 69) from the chamber (3), an alarm and precaution unit (54), a control unit (50) connected to the indicator unit (53) and to the alarm and precaution unit (54), the control unit (50) operable to provide an alarm signal to the alarm and precaution unit (54) upon receipt of a signal from the indicator unit (53).

* * * * *